(12) United States Patent
Domeier et al.

(10) Patent No.: US 10,981,543 B2
(45) Date of Patent: Apr. 20, 2021

(54) WIPER SUBASSEMBLY FOR A MOTOR VEHICLE

(71) Applicant: Ford Global Technologies, LLC, Dearborn, MI (US)

(72) Inventors: Jan Domeier, Cologne (DE); Florian Lammering, Cologne (DE); Sebastian Henne, Cologne (DE); Theo Geuecke, Attendorn (DE); Christoph Kueppers, Kerpen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 672 days.

(21) Appl. No.: 15/892,567

(22) Filed: Feb. 9, 2018

(65) Prior Publication Data

US 2018/0290629 A1 Oct. 11, 2018

(30) Foreign Application Priority Data

Apr. 10, 2017 (DE) .......................... 102017206133.2

(51) Int. Cl.
*B60S 1/04* (2006.01)
*B62D 25/14* (2006.01)
(Continued)

(52) U.S. Cl.
CPC .......... *B60S 1/0488* (2013.01); *B60S 1/0441* (2013.01); *B08B 1/005* (2013.01); *B60S 1/0419* (2013.01); *B60S 1/0433* (2013.01); *B60S 1/0444* (2013.01); *B62D 25/081* (2013.01); *B62D 25/14* (2013.01); *Y10T 403/11* (2015.01)

(58) Field of Classification Search
CPC .... B60S 1/0422; B60S 1/0425; B60S 1/0427; B60S 1/043; B60S 1/0433; B60S 1/0436; B60S 1/0438; B60S 1/0441; B60S 1/0444; B60S 1/0447; B60S 1/0488; Y10T 403/11
See application file for complete search history.

(56) References Cited

U.S. PATENT DOCUMENTS 6,027,157 A * 2/2000 Epple .................... B60S 1/0436
15/250.31
6,899,370 B2 5/2005 Kalchschmidt et al.
(Continued)

FOREIGN PATENT DOCUMENTS

DE 198 51 845 * 9/2003 ................ B60S 1/04
DE 60310470 T2 9/2007
(Continued)

*Primary Examiner* — Michael P Ferguson
(74) *Attorney, Agent, or Firm* — David Coppiellie; Price Heneveld LLP (57) ABSTRACT

A wiper subassembly for a motor vehicle has a windshield wiper retention member connected by a front connection arrangement in the longitudinal direction of the motor vehicle to a first bodywork component and by a rear connection arrangement to a second bodywork component. In order to optimize the crash behavior of a wiper subassembly, the front connection is arranged to be configured, when a threshold force which acts in the longitudinal direction between the windshield wiper retention member and the first bodywork component is exceeded, to give way so that the first bodywork component can be moved to the rear relative to the windshield wiper retention member.

13 Claims, 6 Drawing Sheets

(51) Int. Cl.
*B62D 25/08* (2006.01)
*B08B 1/00* (2006.01)

(56) References Cited

U.S. PATENT DOCUMENTS

| | | | |
|---|---|---|---|
| 7,805,799 | B2 | 10/2010 | Reid et al. |
| 7,956,502 | B2 | 6/2011 | Nakamura et al. |
| 8,819,888 | B2 | 9/2014 | Iizuka et al. |
| 2007/0011839 | A1 | 1/2007 | Princet et al. |
| 2009/0199373 | A1* | 8/2009 | Boissac .................. B60S 1/583 24/524 |

FOREIGN PATENT DOCUMENTS

| | | |
|---|---|---|
| DE | 102009056237 A1 | 6/2011 |
| DE | 102011121898 A1 | 6/2013 |
| DE | 102011121920 A1 | 6/2013 |
| JP | 2005335572 A | 12/2005 |

\* cited by examiner

WIPER SUBASSEMBLY FOR A MOTOR VEHICLE

FIELD OF THE INVENTION

The present invention generally relates to a wiper subassembly for a motor vehicle, and more particularly to a wiper subassembly having a windshield wiper retention member.

BACKGROUND OF THE INVENTION

Windshield wipers of modern motor vehicles generally are electrically driven. The corresponding motor is typically secured to a retention member which may also have bearings for the pivot shafts of the wiper arms and for mechanical elements for the transmission of force from the motor to the pivot shafts. The retention member which where applicable may comprise a plurality of components which are connected to each other is itself secured to the bodywork of the motor vehicle. In this instance, different connection concepts are known. One of these makes provision for the retention member to be secured in the travel direction at the front to a transverse strut of a cowl plenum which is used for reinforcement between shock-absorbing leg domes and at the rear to a dash panel which terminates the engine compartment with respect to the passenger compartment. The dash panel is often welded at the upper end thereof to a cowl top panel or where applicable laterally to the A-pillar.

In the event of a front-end collision, the cowl plenum may be deformed and compressed in the travel direction, which generally leads to the above-mentioned retention member being pushed together with the above-mentioned engine onto the dash panel and the dash panel potentially becoming deformed into the passenger compartment. This is partially a result of the fact that the retention member brings about a reinforcement of the cowl plenum and thus inhibits the deformation thereof which is important for energy absorption. In this instance, it may also lead to a tearing of the weld connection between the dash panel and the cowl top panel and where applicable other weld connections. All of this may be undesirable.

U.S. Pat. No. 6,899,370 B2 discloses a securing of a wiper installation on a vehicle bodywork by use of a resilient securing element. The securing element rests in a receiving opening of the wiper installation or the vehicle bodywork with a through-opening on a journal of the other component. The securing element is pretensioned, whereby a defined friction force is produced between a peripheral face of the securing element and the adjacent component. By overcoming this defined friction force, in the event of an accident the connection between the wiper installation and the vehicle bodywork can be released, whereby they can become disengaged from each other in a vertical direction.

U.S. Pat. No. 7,805,799 B2 sets out a retention member arrangement for a wiper system of a motor vehicle. In this instance, a pivot shaft arrangement of the wiper system is connected to a vehicle component by an assembly retention member. A rubber ring sealing sleeve is releasably connected to the assembly retention member and is provided to dampen vibrations between it and the vehicle component. A pipe liner is arranged with a pillar component inside the rubber ring sealing sleeve, wherein a platform which adjoins the pillar component in a flange-like manner is arranged at the lower side of the rubber ring sealing sleeve and produces a positive-locking connection with the assembly retention member. A flange screw is screwed through the vehicle component into the pillar component. According to one embodiment, there are formed on the platform bending lines on which the platform systematically buckles under the action of a perpendicular force component in order thus to enable release of the retention member arrangement. The pivot shaft arrangement and a portion of a wiper arm can thereby be displaced downward in the event of a pedestrian collision.

JP 2005/335572 A discloses a windshield wiper arrangement having two rotary bearings for rotatable shafts of the wiper arms, wherein the rotary bearings are fitted at the end side of two tubular arm portions. These arm portions are pivotably connected to each other, but in the normal operating state are secured by a securing element. In the event of an accident, the securing element may break, whereby the arm portions as a result of a resilient action with respect to each other pivot backward into the vehicle body.

U.S. Pat. No. 8,819,888 B2 and U.S. Pat. No. 7,956,502 B2 each set out windshield wiper arrangements in which for each wiper there is provided a pivot shaft retention member which is constructed in an integral manner with a connection portion. The connection portion is provided for connection to a vehicle body and has a recess in which a rubber element is received. Through a through-opening of the rubber element there is guided a screw by which the connection portion is secured to the vehicle body.

In view of the prior art set out, the connection of a wiper installation to the bodywork of a motor vehicle with respect to the safety in the event of front-end collisions still leaves room for improvement. It would be desirable to optimize the crash behavior of a wiper subassembly.

SUMMARY OF THE INVENTION

According to one aspect of the present invention, a wiper subassembly for a motor vehicle is provided. The wiper subassembly includes a windshield wiper retention member connected by a front connection arrangement in a longitudinal direction of the motor vehicle to a first bodywork component and by a rear connection arrangement to a second bodywork component. The front connection arrangement is configured when a threshold force which acts in the longitudinal direction between the windshield wiper retention member and the first bodywork component is exceeded, to give way so that the first bodywork component can be moved backward relative to the windshield wiper retention member.

According to another aspect of the present invention, a vehicle wiper subassembly is provided. The vehicle wiper subassembly includes a windshield wiper retention member connected by a front connection arrangement in a vehicle longitudinal direction to a bodywork component that is configured to give way so that the bodywork component can be moved backward relative to the windshield wiper retention member when a force acts in the longitudinal direction between the windshield wiper retention member and the bodywork component.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the various figures, identical components are always given the same reference numerals, for which reason they are generally also only described once.

Figure 1:
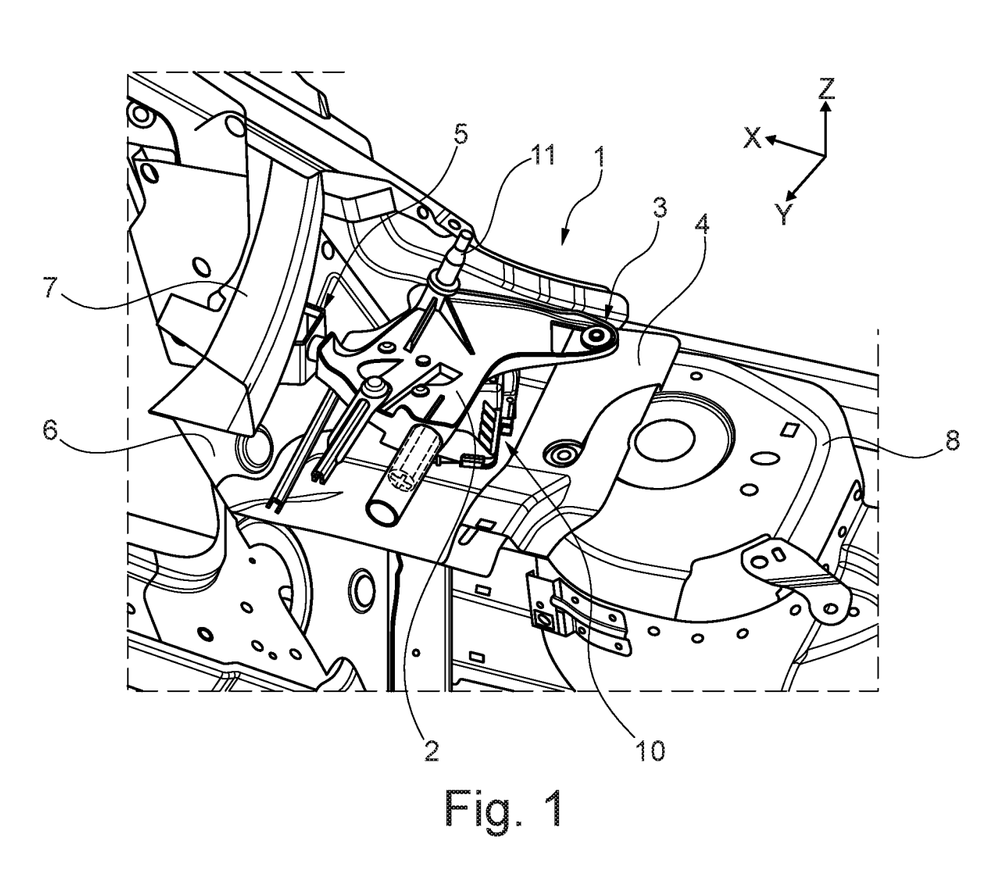
FIG. 1 is a perspective illustration of a portion of a motor vehicle with a wiper subassembly according to one embodiment.

FIG. 1 is a perspective illustration of a portion of a motor vehicle, such as a passenger vehicle, having a wiper subassembly 1. Shown is a shock absorber dome 8 having a transverse strut 4 of a cowl plenum secured thereto. Along an X axis which defines the longitudinal direction of the motor vehicle, further to the rear is illustrated a dash panel 6 which terminates the engine compartment with respect to the passenger compartment. At the upper side thereof, the dash panel 6 is welded to a cowl top panel 7. Furthermore, a windshield wiper retention member 2 can be seen and is connected by a front connection arrangement 3 to the transverse strut 4 and by a rear connection arrangement 5 to the dash panel 6. At the lower side of the windshield wiper retention member 2, a windshield wiper motor 10 is connected thereto. On the windshield wiper retention member 2, various movable elements are further supported, for example, a pivot shaft 11 of a windshield wiper.

A more precise structure of the windshield wiper retention member 2 and the front connection arrangement 3 is explained below with reference to FIGS. 2-6C.

Figure 2:
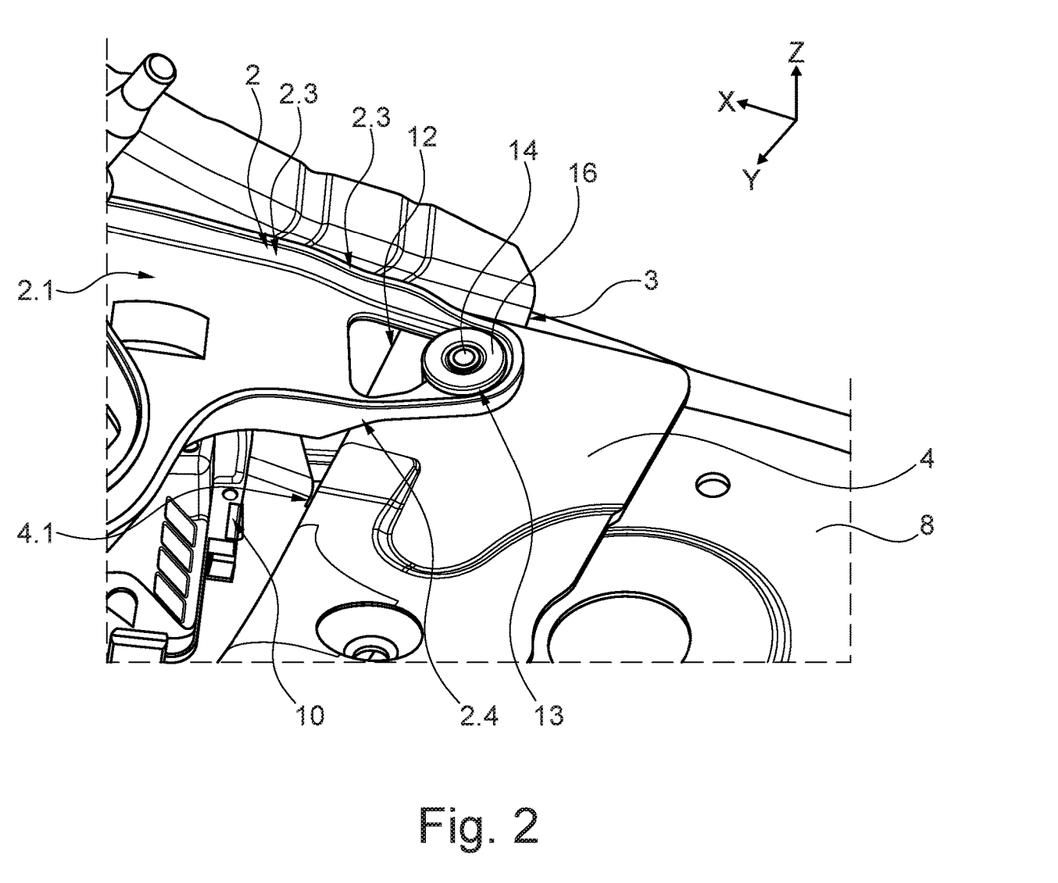
FIG. 2 is an enlarged detailed illustration of a portion of the wiper subassembly of FIG. 1.

As can be seen in the enlarged illustration of FIG. 2, the windshield wiper retention member 2 which may comprise, for example, grey cast iron, may have a plate-like or planar portion 2.1 which merges at the edge side into a peripheral flange 2.3. In the region of the front connection arrangement 3 inside the planar portion 2.1, there is formed a through-opening 12 through which a retention arrangement 13 is guided. As a result of the retention arrangement 13, a positive-locking connection is produced between the windshield wiper retention member 2 and the transverse strut 4. As can be seen in particular in the sectioned illustration in FIG. 5, the retention arrangement 13 has a screw 14, a plate element 15 (which has been omitted in FIG. 2), a deformation element 16 and a weld nut 17. Apart from the deformation element 16 which is produced from rubber, the elements 14, 15, 17 mentioned comprise steel. While a head 14.1 of the screw 14 is arranged at the upper side of the plate element 15, a shaft portion 14.2 of the screw 14 is guided through the plate element 15, the deformation element 16 and through a through-opening 18 of the transverse strut 4 and screwed to the weld nut 17. The deformation element 16 is thereby secured to the transverse strut 4. The through-opening 18 can also be constructed as a hole.

Figure 6A:
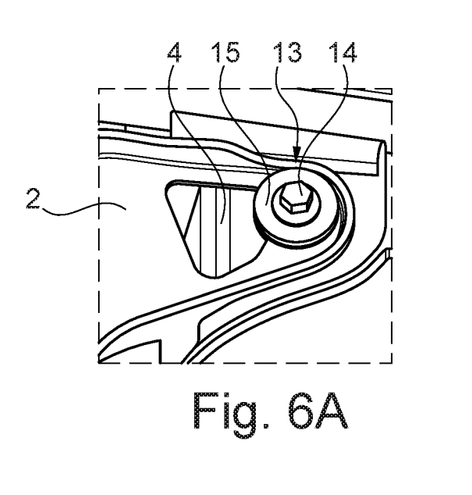
FIGS. 6A-6C are detailed illustrations of the wiper subassembly of FIG. 1, in which different elements have been removed.
Figure 6B:
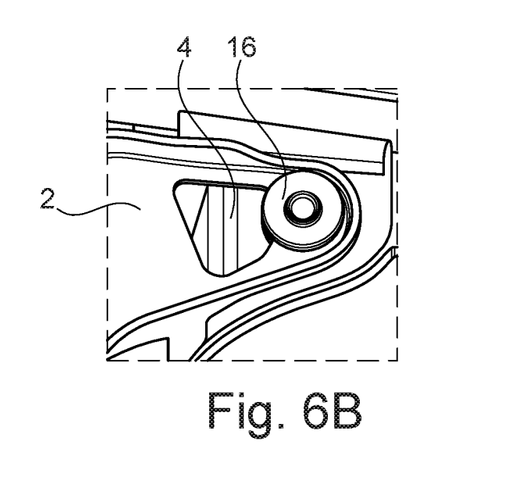
Figure 6C:
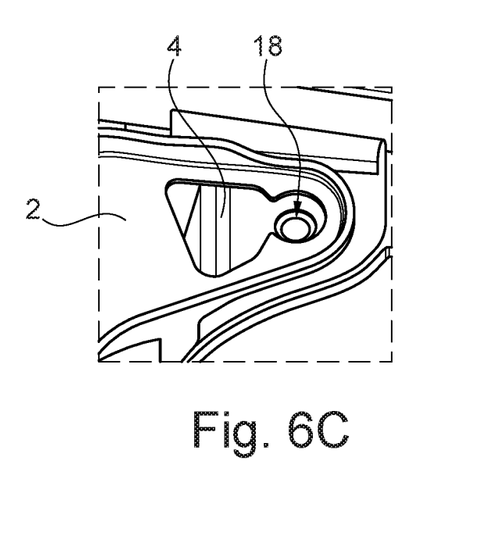

The structure of the retention arrangement 13 is also clarified in FIGS. 6A-6C, wherein FIG. 6A shows the complete retention arrangement 13, while in FIG. 6B the screw 14 and the plate element 15 have been removed so that the deformation element 16 can be seen. In FIG. 6C, the deformation element 16 has also been removed so that the through-opening 18 can be seen.

Figure 5:
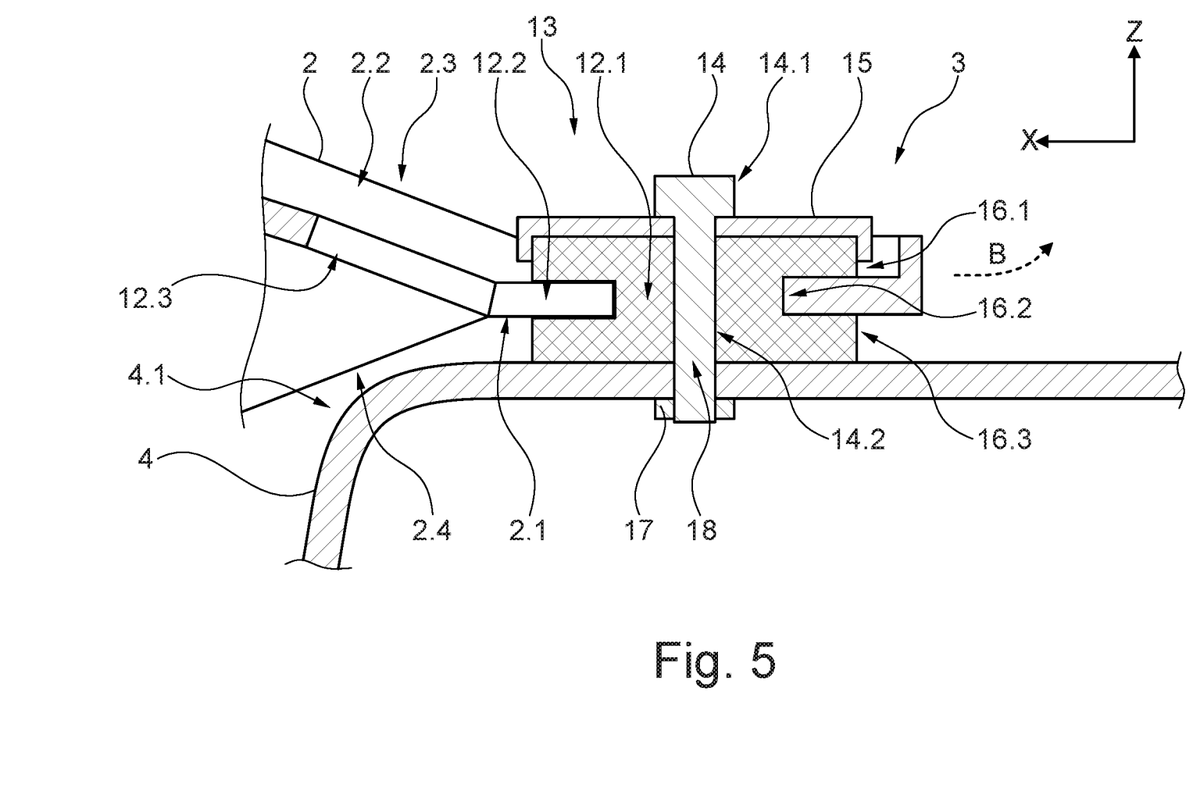
FIG. 5 is a second sectioned illustration of the wiper subassembly of FIG. 1.

As can also be seen in FIG. 5, the generally cylinder-symmetrical deformation element 16 has an upper portion 16.1, a central portion 16.2 and a lower portion 16.3. The upper portion 16.1 and the lower portion 16.3 have a larger diameter than the central portion 16.2 and are in abutment at the upper side or at the lower side with the planar portion 2.1 of the windshield wiper retention member 2, adjacent to a securing region 12.1 and a narrowed region 12.2 of the through-opening 12. In this case, the plate element 15 serves to distribute the clamping force which is applied by the screw 14 in a uniform manner over the upper portion 16.1, whereby an effective non-positive-locking connection is produced between the upper portion 16.1 and the windshield wiper retention member 2. Furthermore, the deformation element 16 is received in a positive-locking manner inside the above-mentioned securing portion 12.1 of the through-opening 12. In this instance, the positive-locking connection is produced in the longitudinal direction by the securing region 12.1 being adjoined by the narrowed region 12.2 which can be seen in particular in FIG. 3 and on which two securing projections 2.5 are formed at the edge side. At the rear, the narrowed region 12.2 is adjoined by a release region 12.3 which is arranged in a portion 2.2 of the windshield wiper retention member 2 which rises from the front toward the rear.

Figure 3:
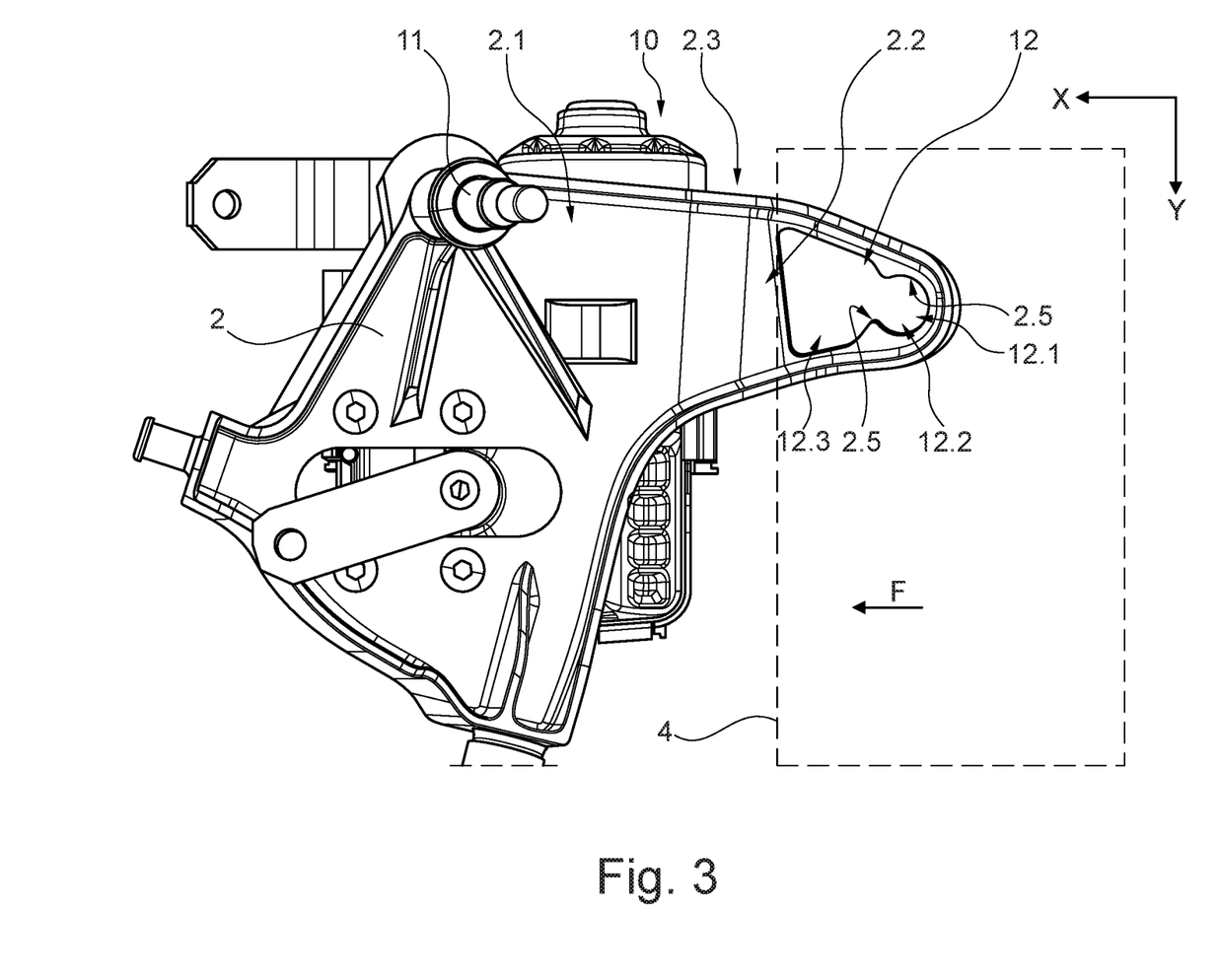
FIG. 3 is a plan view of a portion of the wiper subassembly of FIG. 1.

As can be seen clearly in FIG. 3, the release region 12.3 has a larger transverse dimension than the securing region 12.1. This dimension is selected to be so large that it at least corresponds to the diameter of the upper portion 16.1 of the deformation element 16. The internal dimension of the securing region 12.1 substantially corresponds to the diameter of the central portion 16.2 of the deformation element 16. In contrast, the spacing of the two securing projections 2.5 is significantly smaller, for which reason in the normal operating state there is a positive-locking connection in the direction of the X axis between the deformation element 16 and the through-opening 12.

In the event of a front-end collision, it may be the case that the transverse strut 4 is pressed backward in the direction toward the dash panel 6. In this instance, a threshold force F which acts in the longitudinal direction (in the direction of the X axis) may be exceeded, whereby the above-mentioned positive-locking connection is cancelled. This is a result of the fact that the central portion 16.2 is pressed between the securing projections 2.5 and is resiliently deformed so that the deformation element 16 can ultimately move out of the securing region 12.1 through the narrowed region 12.2 into the release region 12.3. In this instance, it is possible for the position of the windshield wiper retention member 2 to change with respect to the dash panel 6 only to a small extent, that is to say, although the transverse strut 4 moves toward the dash panel 6 the windshield wiper retention member 2 and the windshield wiper motor 10 which is secured thereto are normally at most pressed slightly into the dash panel 6. In the event of a more powerful pressing-in action, there would otherwise be the risk of deformation or tearing of the weld connection with respect to the cowl top panel 7.

Figure 4:
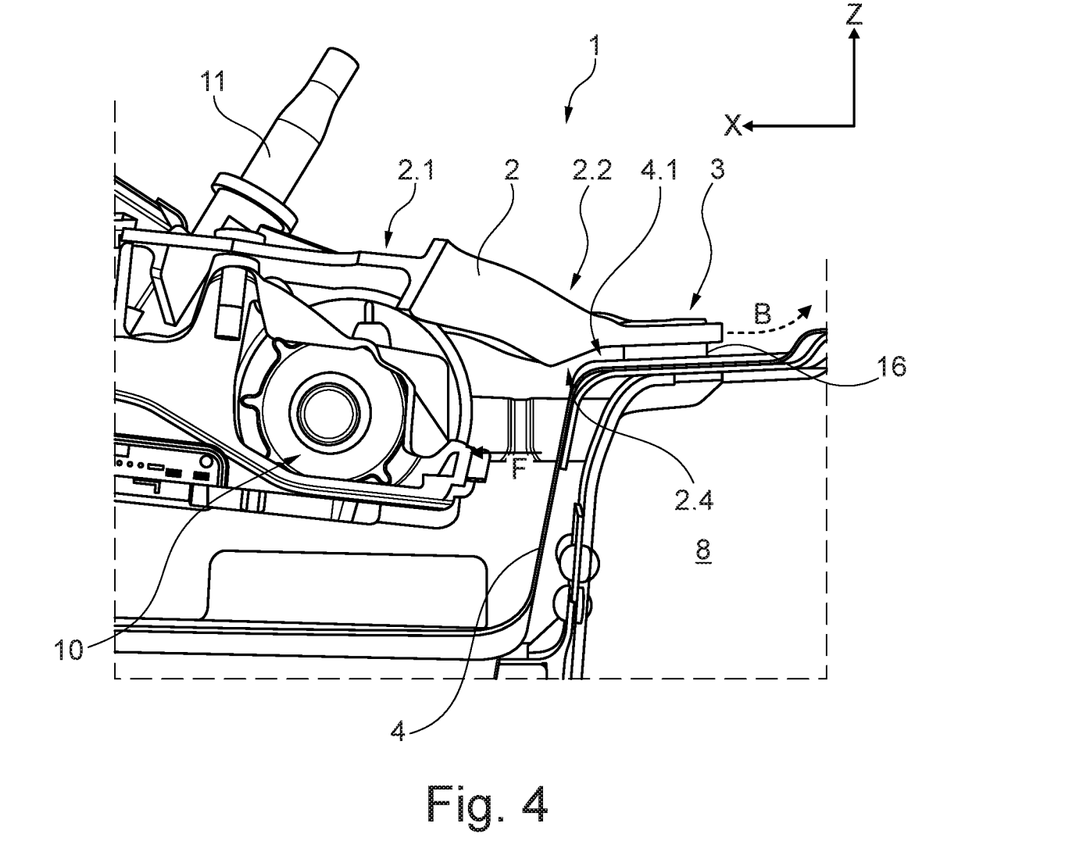
FIG. 4 is a first sectioned illustration of the wiper subassembly of FIG. 1.

In order to achieve complete decoupling of the deformation element 16 from the windshield wiper retention member 2, the deformation element 16 is subsequently moved through the release region 12.3 in a downward direction out of the through-opening 12. To this end, there is formed on the flange 2.3 at the lower side a chamfered ramp portion 2.4 which is arranged in the longitudinal direction behind a counter-portion 4.1 on the surface of the transverse strut 4. If the transverse strut 4 moves toward the rear, the counter-portion 4.1 and the ramp portion 2.4 cooperate so that the windshield wiper retention member 2 is redirected upward, whereby the deformation element 16 is moved downward out of the through-opening 12. In FIGS. 4 and 5, a corresponding movement path B of the windshield wiper retention member 2 in relation to the transverse strut 4 is indicated.

It should be noted that the features and measures set out individually in the following description can be combined with each other in any technically advantageous manner and set out other embodiments of the wiper subassembly. The description additionally characterizes and specifies the wiper subassembly in particular in connection with the figures.

As a result of the disclosure, a wiper subassembly for a motor vehicle is provided. Motor vehicles include in particular passenger vehicles. The term "wiper subassembly" is in this instance not intended to be interpreted to be limiting and is intended to mean only that components of the arrangement are intended to be functionally associated with at least one windshield wiper of the motor vehicle. In place of a "wiper subassembly," it would also be possible to refer to a "retention arrangement for a windshield wiper."

The wiper subassembly has a windshield wiper retention member which is connected by a front connection arrangement in the longitudinal direction of the motor vehicle to a first bodywork component and by a rear connection arrangement to a second bodywork component. The windshield wiper retention member may in this instance be constructed in one or more pieces. It is normally used to movably support at least one movable component of a windshield wiper or a windshield wiper drive. For example, it may form a bearing for a pivot shaft of a windshield wiper. Furthermore, the windshield wiper retention member normally serves to secure a windshield wiper motor. This may, for example, be received in a housing which is formed by the windshield wiper retention member or in a separate housing which is secured to the windshield wiper retention member. The windshield wiper retention member is provided to form a base which is stationary with respect to the vehicle bodywork and on which the windshield wiper motor is generally secured and on which movable components of a windshield wiper mechanism are supported. In order to ensure the necessary mechanical stability, the windshield wiper retention member is normally produced from metal, for example, steel, grey cast iron or aluminum. It may be at least partially produced as a shaped sheet metal component.

The securing to the bodywork is carried out by at least two connection arrangements. A front connection arrangement connects the windshield wiper retention member to a first bodywork component and a rear connection arrangement connects the windshield wiper retention member to a second bodywork component. The terms "front" and "rear" refer in this instance to the longitudinal direction (X direction) of the motor vehicle. That is to say, the front connection arrangement is located in the travel direction further forward than the rear connection arrangement (wherein the two connection arrangements are not, however, generally in alignment along the X axis of the motor vehicle). This also results in the first bodywork component at least partially having to be arranged further forward than the second bodywork component. In particular, the first bodywork component may be a transverse strut or a limiting metal sheet of a cowl plenum. Furthermore, the second bodywork component may in particular be a dash panel. Each of the connection arrangements may in addition to the windshield wiper retention member and the respective bodywork component have one or more additional components. In particular, it is possible that at least one component is interposed between the windshield wiper retention member and the bodywork component so that they are not directly in contact with each other.

According to one embodiment, the front connection arrangement is configured to systematically give way when a threshold force acting in the longitudinal direction between the windshield wiper retention member and the first bodywork component is exceeded so that the first bodywork component can be moved backward relative to the windshield wiper retention member. The threshold force mentioned represents in this instance a threshold value of a force which when exceeded causes the front connection arrangement to give way. Of course, this threshold value is already not precise as a result of component tolerances but can only be approximately predetermined. The corresponding threshold force acts in this instance in the longitudinal direction of the vehicle between the windshield wiper retention member and the first bodywork component. Strictly speaking, this should of course be referred to as a force pairing, wherein a force acts on the windshield wiper retention member and the counter-force acts on the first bodywork component. The threshold force is in this instance preferably selected in such a manner that it is not exceeded during normal operation of the motor vehicle, but instead in the event of a collision, in particular a front-end collision, in which the first bodywork component is pushed backward. In accordance with the respective type and direction of the collision in addition to the force acting in the longitudinal direction, forces may also act parallel with the transverse axis or vertical axis. However, these are, for the systematic yielding of the front connection arrangement, either not significant or not necessary. The systematic yielding of the front connection arrangement may, for example, be implemented by one or more desired breaking locations. Alternatively, the yielding may be carried out by a plastic and/or a resilient deformation of a component of the connection arrangement.

If the threshold force is exceeded, the front connection arrangement gives way and thus releases a relative movement of the first bodywork component with respect to the windshield wiper retention member in such a manner that the first bodywork component can be moved backward relative to the windshield wiper retention member. The relative movement in this instance does not have to take place parallel with the longitudinal axis of the vehicle, but instead it can also contain components in the direction of the transverse axis and/or the vertical axis of the vehicle. However, it may comprise a component in the direction of the longitudinal axis. There is on the whole produced a systematic separation of the first connection arrangement, wherein components thereof can continue to remain connected to the windshield wiper retention member or the first bodywork component.

As a result of the systematic yielding of the front connection arrangement, the first bodywork component can move backward, while the windshield wiper retention member at least in the longitudinal direction can approximately retain its position with respect to the second bodywork component and consequently is not (or only to a smaller extent) pushed backward toward the second bodywork component. Damage and deformation of the second bodywork component are thereby substantially prevented. If the second bodywork component is a dash panel, this is not deformed or deformed only to a small extent. Tearing away of a weld connection with respect to an adjacent component, for example, a cowl top panel, can also be prevented. The bodywork components adjacent to the vehicle inner space can thus remain substantially intact. As a result of the wiper subassembly the safety, in particular in the region of the vehicle inner space, may be significantly improved.

Preferably, the front connection arrangement has a through-opening of the windshield wiper retention member and a retention arrangement which is guided through the through-opening. The through-opening is in this instance generally a continuous opening which normally extends through the windshield wiper retention member in the direction of the vertical axis (Z axis) of the motor vehicle. Optionally, the through-opening may be partially open at the edge side transversely relative to the passage direction thereof. According to another embodiment, the through-opening is closed at the edge side. The retention arrangement which may itself be constructed in one or more pieces is normally produced separately from the first bodywork component. It may be connected using different connection methods, for example, by positive and/or non-positive locking, to the first bodywork component, for example, by screwing. As a result of the fact that the retention arrangement is guided through the through-opening, an at least partial positive-locking connection is produced. In the normal operating state of the vehicle, the windshield wiper retention member is secured to the first bodywork component by the retention arrangement. In this instance, a positive-locking connection can be supplemented by a non-positive-locking connection.

The windshield wiper retention member may, in particular in the region of the through-opening, be constructed in a planar or thin-walled manner so that a material thickness in the passage direction is significantly smaller than the material extent transversely relative thereto. This may, for example, be produced by the windshield wiper retention member being constructed as a shaped sheet metal component, wherein, however, an embodiment as a cast component is also conceivable. The extent of the through-opening is in this instance also normally transverse relative to the passage direction significantly greater than in the passage direction. At the edge side of a planar portion of the windshield wiper retention member, a flange may be formed.

As already mentioned above, the systematic yielding may be produced by one or more desired breaking locations. It would, for example, be conceivable for such a desired breaking location to be provided at an edge region of the through-opening or, however, for the retention arrangement to have a desired breaking location. According to another embodiment, the retention arrangement has at least one elastomer deformation element which is received in a positive-locking manner in the through-opening, wherein the positive-locking connection can be cancelled by deformation of the deformation element when the threshold force is exceeded. In the normal operating state, there is thus a positive-locking connection between the deformation element and the windshield wiper retention member. This positive-locking connection prevents a movement of the deformation element within the through-opening in the longitudinal direction (X direction) of the motor vehicle. In addition, a positive-locking connection in the transverse direction (Y direction) and in the vertical direction (Z direction) is normally also produced. The deformation element is elastomer-like or resilient, that is to say, it comprises rubber or another elastomer material, such as, for example, silicone. As a result of a resilient deformation of the deformation element which occurs when the threshold force is exceeded, the positive-locking connection is cancelled so that the deformation element can move with respect to the windshield wiper retention member. In this instance, the deformation element normally remains directly or indirectly connected to the first bodywork component.

The deformation element may have an upper portion which is arranged above the windshield wiper retention member, a central portion which is arranged in the through-opening, and a lower portion which is arranged below the windshield wiper retention member. In this instance, the upper and the lower portion have a larger cross section than the central portion. They may in this instance serve to produce or improve the positive-locking connection in a perpendicular direction. The upper and/or the lower portion may be in abutment at the upper side or lower side in the region of the through-opening against the windshield wiper retention member. As a result of the action of force, the upper and/or the lower portion may be tensioned parallel with the passage direction of the through-opening against the windshield wiper retention member, whereby a given positive-locking connection is supplemented by a non-positive-locking connection. All three portions mentioned may have a circular cross section.

Preferably, a securing element which is secured to the first bodywork component is guided through the deformation element. This securing element may, for example, be a screw which is guided through the deformation element and which is screwed into an inner thread at the side of the first bodywork component. Of course, the deformation element in this embodiment has a continuous opening. According to an embodiment, the deformation element may be constructed in a cylinder-symmetrical manner with respect to this opening. A screw may also be used to clamp the upper portion of the deformation element in the direction of the windshield wiper retention member. To this end, the screw may be constructed as a flange screw and/or a washer or another plate-like element may be interposed in order to distribute the clamping force of the screw better over the upper portion.

Advantageously, the through-opening has a securing region for the positive-locking securing of the deformation element and a release region which is located therebehind in the longitudinal direction and which is set back from the securing region by a narrowed region. It is thus possible in this embodiment to distinguish at least three regions inside the through-opening. The securing region is sized in such a manner that the deformation element in the normal operating state can be secured therein in a positive-locking manner. This is adjoined by the narrowed region whose transverse dimension is smaller than that of the securing region. The narrowed region may also be at least partially considered to be part of the securing region since its function involves preventing a movement of the deformation element. Such a movement is possible when the deformation element is deformed in such a manner that it can pass through the narrowed region in order to reach a third region, the release region. The release region has, in turn, with respect to the narrowed region a larger transverse dimension so that the deformation element can move more readily at that location than within the narrowed region. In particular, it is possible for the resilient deformation, which is required in order to pass the narrowed portion, to be reversed in the release region.

In particular at the edge side of the narrowed region, two inwardly directed securing protrusions may be formed. These securing protrusions constitute regions in which the edge of the through-opening protrudes inward. These two securing protrusions are, of course, opposite each other. The securing protrusions are spaced apart from each other along the transverse axis of the vehicle, wherein they may further also be offset relative to each other along the longitudinal axis and/or the vertical axis. Under some circumstances, a notional connection line may extend between the two securing protrusions perpendicularly to a provided movement direction of the deformation element during the release. That is to say, when the provided movement direction extends in the longitudinal direction of the vehicle, the connection line extends in the transverse direction. By adapting the spacing and the shape of the securing protrusions, it is possible, inter alia, to adjust the threshold force.

The release region may be constructed to be wider than the securing region. Generally, the release region may have a larger cross-sectional surface-area than the securing region. In particular, a maximum dimension in the transverse direction in the release region may be greater than in the securing region. In addition, a maximum dimension in the longitudinal direction may also be greater in the release region than in the securing region.

The windshield wiper retention member may have at the lower side a ramp portion which extends toward the rear in a downward direction and which is arranged in the longitudinal direction behind a counter-portion of the first bodywork component. The ramp portion may in this instance in particular be inclined in an oblique manner with respect to the horizontal plane. In particular, the windshield wiper retention member may have an edge-side flange which forms the ramp portion. Such a flange may extend in a substantially perpendicular manner. The ramp portion is arranged in the longitudinal direction behind a counter-portion which forms a portion of the first bodywork component. In particular, the ramp portion may be in alignment in the longitudinal direction with the counter-portion. If the first bodywork component with the counter-portion moves in the longitudinal direction toward the rear, the ramp portion cooperates with the counter-portion so that a perpendicular force component is produced. This leads to a perpendicular redirection of the windshield wiper retention member and the first bodywork component relative to each other.

In this instance, there is preferably provision for the windshield wiper retention member to be able to be redirected upward with respect to the first bodywork component by cooperation of the ramp portion and the counter-portion in such a manner that the deformation element is guided by the release region out of the passage opening. As already explained above, the cooperation of the ramp portion and counter-portion may lead to a vertical redirection of the windshield wiper retention member so that it is lifted with respect to the first bodywork component. With a suitable adaptation of the geometry, this may be used to raise the portion of the windshield wiper retention member which surrounds the release region via the deformation element or for the latter to be guided downward through the release region out of the passage opening. The positive-locking connection between the deformation element and the through-opening can thereby be completely cancelled and the windshield wiper retention member can be completely decoupled from the first bodywork component. In an embodiment, in which the deformation element has an upper portion which has a larger cross section than a central portion, a dimension of the release opening corresponds to at least a dimension of the upper portion. In order to support the guiding-out action of the deformation element, the release portion may be formed in a portion of the windshield wiper retention member which extends or rises toward the rear in an upward direction.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A wiper subassembly for a motor vehicle, the wiper subassembly comprising:
   a windshield wiper retention member configured to support a windshield wiper motor and drive assembly, comprising a substantially planar bracket member having a front portion and an opposing rear portion in a longitudinal direction thereof, the front portion being connected by a front connection arrangement to transverse strut of a cowl plenum, and the rear portion being connected by a rear connection arrangement to a dash panel;
   wherein the front connection arrangement comprises a through-opening extending throw the bracket member and an elastomer deformation element secured to and extending upwardly from the transverse strut, the deformation element being received in a positive-locking manner in the through-opening;
   wherein the through-opening comprises an enclosed hole having a securing region at a front portion thereof for positive-locking of the deformation element therein, and a release region at a rear portion thereof for releasing the deformation element therefrom, the release region being separated from the securing region by a narrowed region of the hole; and
   wherein, when a threshold force which acts in the longitudinal direction is exceeded, pressing the transverse strut backward toward the dash panel, the deformation element is resiliently deformed by the narrowed region and guided from the securing region to the release region and released from the through-opening.

2. The wiper subassembly as claimed in claim 1, wherein a securing element secured to the transverse strut extends through the deformation element.

3. The wiper subassembly as claimed in claim 1, wherein at an edge side of the narrowed region two inwardly directed securing projections are formed.

4. The wiper subassembly as claimed in claim 1, wherein the release region is constructed to be wider than a than the securing region.

5. The wiper subassembly as claimed in claim 4, wherein the windshield wiper retention member has at a lower side a ramp portion which extends toward the rear in a downward direction and which is arranged in the longitudinal direction behind a counter-portion of the transverse strut.

6. The wiper subassembly as claimed in claim 5, wherein the windshield wiper retention member can be redirected upward with respect to the transverse strut by cooperation of the ramp portion and the counter-portion in such a manner that the deformation element is guided by the release region out of the through-opening.

7. A vehicle wiper subassembly comprising:
   a windshield wiper retention member configured to support a windshield wiper motor and drive assembly, comprising a substantially planar bracket member having a front portion and an opposing rear portion in a longitudinal direction thereof, the front portion being connected by a front connection arrangement to a transverse strut of a cowl plenum;

wherein the front connection arrangement comprises a through-opening extending through the bracket member and an elastomer deformation element secured to and extending upwardly from the transverse strut, the deformation element being received in a positive-locking manner in the through-opening;

wherein the through-opening comprises an enclosed hole having a securing region at a front portion thereof for positive-locking of the deformation element therein, therefrom, the release region being separated from the securing region by a narrowed region of the hole; and wherein, when a threshold force which acts in the longitudinal direction is member, the deformation element is resiliently deformed by the narrowed region and guided from the securing region to the release region and released from the through-opening.

8. The wiper subassembly as claimed in claim 7, wherein the windshield wiper retention member is connected by a rear connection arrangement to a dash panel.

9. The wiper subassembly as claimed in claim 7, wherein a securing element secured to the transverse strut extends through the deformation element.

10. The wiper subassembly as claimed in claim 7, wherein at an edge side of the narrowed region two inwardly directed securing projections are formed.

11. The wiper subassembly as claimed in claim 7, wherein the release region is constructed to be wider than the securing region.

12. The wiper subassembly as claimed in claim 11, wherein the windshield wiper retention member has at a lower side a ramp portion which extends toward the rear in a downward direction and which is arranged in the longitudinal direction behind a counter-portion of the bodywork component transverse strut.

13. The wiper subassembly as claimed in claim 12, wherein the windshield wiper retention member can be redirected upward with respect to the transverse strut by cooperation of the ramp portion and the counter-portion in such a manner that the deformation element is guided by the release region out of the through-opening.

* * * * *

UNITED STATES PATENT AND TRADEMARK OFFICE
CERTIFICATE OF CORRECTION

Page 1 of 1

PATENT NO. : 10,981,543 B2
APPLICATION NO. : 15/892567
DATED : April 20, 2021
INVENTOR(S) : Domeier et al.

It is certified that error appears in the above-identified patent and that said Letters Patent is hereby corrected as shown below:

In the Claims

Column 10:
Claim 1, Line 19;
After "to" insert --a--.
Claim 1, Line 24;
"throw" should be --through--.
Claim 4, Line 49;
Delete "than a".
Column 11:
Claim 7, Line 11;
After "therein," insert --and a release region at a rear portion thereof for releasing the deformation element--.
Claim 7, Line 15;
After "is" insert --exceeded, pressing the transverse strut backward toward the windshield wiper retention--.
Column 12:
Claim 12, Lines 14-15;
After "counter-portion of the" delete "bodywork component".

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*